US008620983B2

(12) United States Patent
Elmer

(10) Patent No.: US 8,620,983 B2
(45) Date of Patent: Dec. 31, 2013

(54) LEADING SIGN DIGIT PREDICTOR FOR FLOATING POINT NEAR SUBTRACTOR

(75) Inventor: Tom Elmer, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 627 days.

(21) Appl. No.: 12/985,180

(22) Filed: Jan. 5, 2011

(65) Prior Publication Data

US 2012/0173597 A1    Jul. 5, 2012

(51) Int. Cl.
G06F 7/42         (2006.01)
G06F 7/00         (2006.01)

(52) U.S. Cl.
USPC .......................................... 708/505; 708/511

(58) Field of Classification Search
USPC ................................... 708/211, 505
See application file for complete search history.

(56) References Cited

U.S. PATENT DOCUMENTS

| | | | |
|---|---|---|---|
| 5,808,926 A * | 9/1998 | Gorshtein et al. | 708/505 |
| 5,831,884 A * | 11/1998 | Suzuki | 708/505 |
| 6,085,208 A | 7/2000 | Oberman et al. | |
| 7,707,236 B2 * | 4/2010 | Srivastava | 708/505 |
| 2003/0055859 A1 * | 3/2003 | Seidel et al. | 708/505 |

OTHER PUBLICATIONS

Schmookler, Martin S. et al. "Leading Zero Anticipation and Detection—A Comparison of Methods." IBM Server Development and IBM Austin Research Laboratory, Austin, TX. IEEE 2001. Downloaded on Apr. 21, 2009 from IEEE Xplore. pp. 7-12.
Seidel, Peter-Michael et al. "On the Design of Fast IEEE Floating-Point Adders." Proceedings of the 15$^{th}$ IEEE Symposium on Computer Arithmetic (ARITH'01). 2001 IEEE. pp. 1-11.

* cited by examiner

Primary Examiner — Chuong D Ngo
(74) Attorney, Agent, or Firm — E. Alan Davis; James W. Huffman

(57) ABSTRACT

An apparatus for predicting leading sign digits in a negative difference includes a comparator that determines a larger of two numbers that differ in magnitude by not more than one digit position. The larger of the two numbers is designated as the subtrahend and the smaller as the minuend. Wires and logic align the subtrahend relative to the minuend by the not more than one digit position and invert the aligned subtrahend. A plurality of NAND gates performs a Boolean NAND function of corresponding digits of the minuend and the aligned inverted subtrahend to produce a prediction string of bits. A zero value is assigned to the most significant bit of the prediction string. A string of leading zeros of the prediction string predicts a corresponding string of leading sign digits of a negative difference of the minuend and aligned subtrahend.

27 Claims, 6 Drawing Sheets

FIG. 3
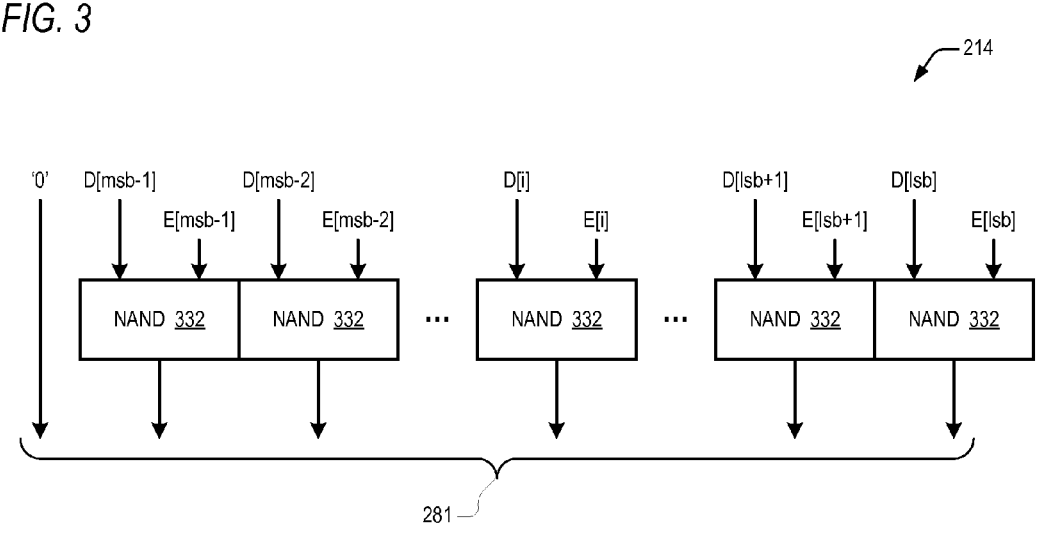
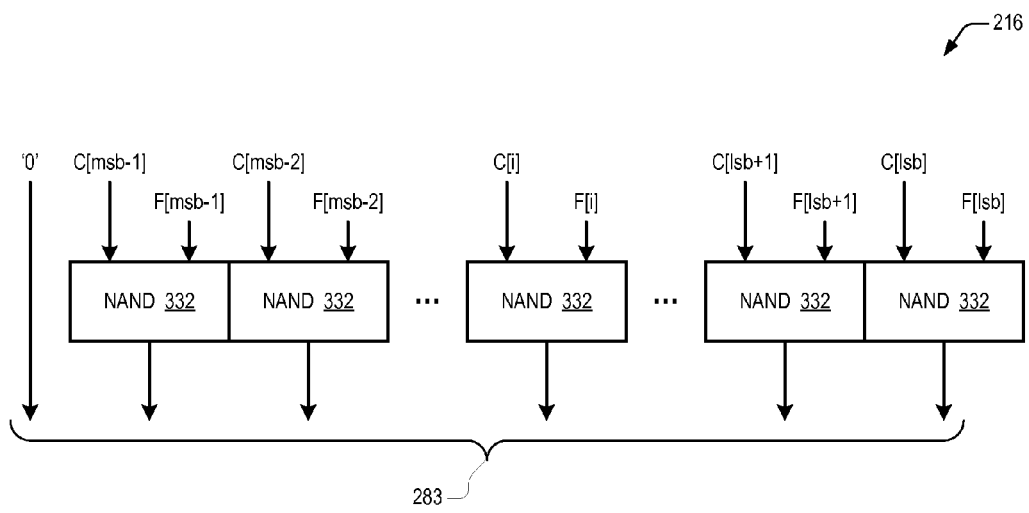

FIG. 5

```
                        EXAMPLE
(1)              A =  10110010, EXP-A = 5
(2)              B =  11010110, EXP-B = 4
(3)    261(D=0:B) =  011010110
(4)             !A =  01001101
(5)    263(E=!A:1) =  010011011
(6)  265(SUM=D+E) =  101110001
(7)    267(SUM+1) =  101110010
(8)            299 = 1
(9)     269 = 271 = 010001110
(10)       PATTERN = ZGTZGTTGT
(11)     281 = 287 = 001101101
(12)           295 = 011011010
(13)           291 = $2_{10}$
(14)           293 = $1_{10}$
(15)           289 = $1_{10}$
(16)           273 = 10001110
(17)     277, 297 = 10001110, EXP = 4
```

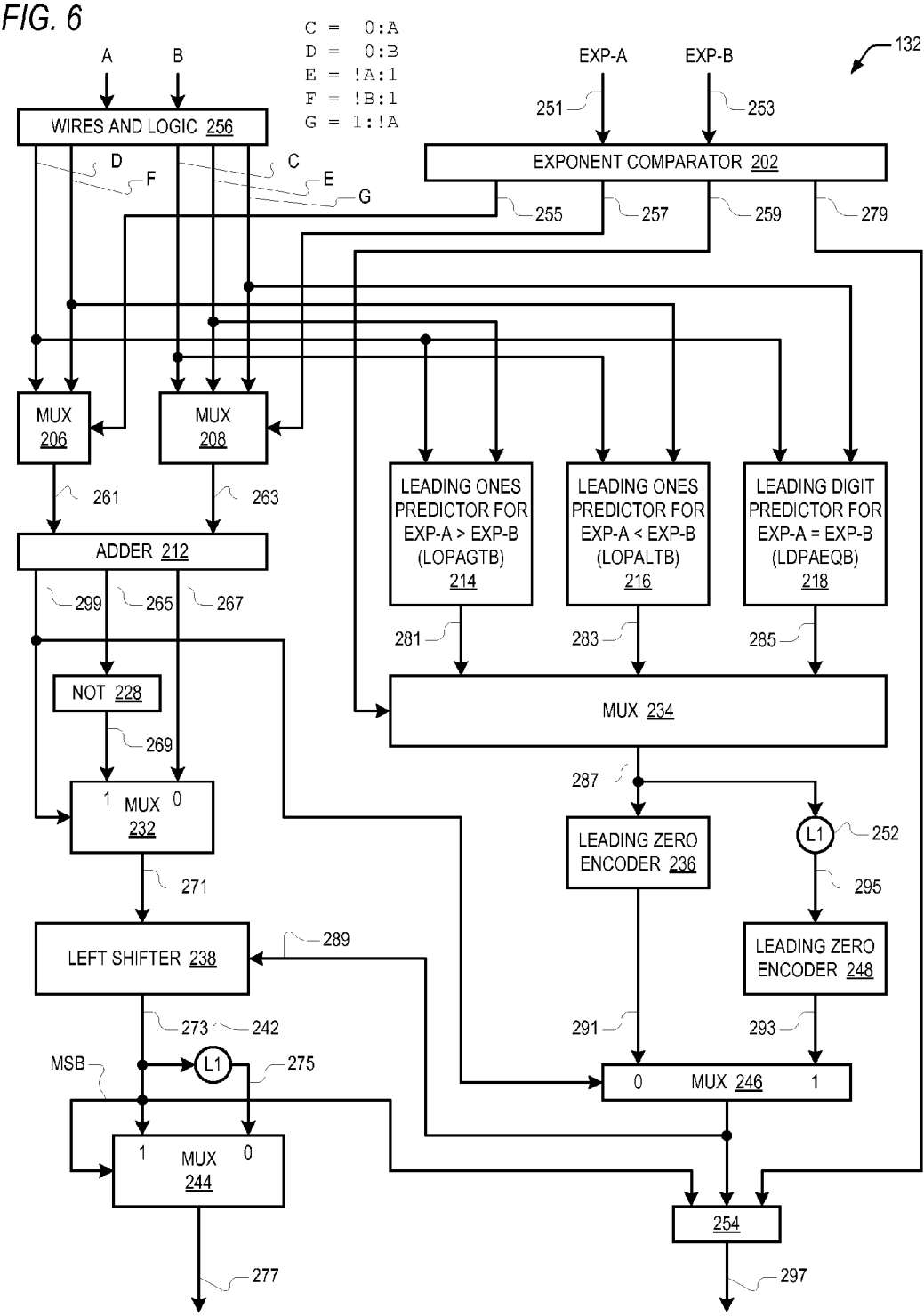

LEADING SIGN DIGIT PREDICTOR FOR FLOATING POINT NEAR SUBTRACTOR

FIELD OF THE INVENTION

The present invention relates in general to the field of floating point subtraction, and particularly to fast normalization of mass cancelled floating point subtraction results through leading digit prediction.

BACKGROUND OF THE INVENTION

"On the design of Fast IEEE Floating-Point Adders," by Seidel and Even, IEEE Computer Society, Proceedings of the 15th IEEE Symposium on Computer Arithmetic (ARITH '01) describes a floating point adder design that includes two distinct paths, known as a "far path" and a "near path," which are well-known in the art of floating point addition units. The near path computes effective subtractions (either an addition instruction in which the two operands have different signs, or a subtraction instruction in which the two operands have the same sign) in which the operands have absolute exponent differences less than or equal to one, and the far path computes all other cases. Each path executes the effective subtraction floating point instruction in parallel, and the final result is primarily selected based on the exponent difference.

In the near path calculation an effective subtraction is performed that may result in elimination of several leading digits of numerical significance, sometimes referred to as "mass cancellation." Consequently, a resulting most significant digit must then be located and left shifted to produce a normal form representation in a process typically called "normalization." In this context, it is desirable to predict the number of leading significant digits that will be eliminated by the subtraction. The prediction is performed in parallel with the actual mantissa subtraction and, in comparison to waiting for the true difference bits, substantially accelerates enumeration of any eliminated leading significant digits. Consequently, the entire normalization process is accelerated.

To illustrate, consider the subtraction of a subtrahend B from a minuend A as follows:

A=10110111
B=10110010
A−B=00000101
B−A=11111010 (one's complement representation)

In the case of A−B, mass cancellation of five significant digits occurs leaving a positive result with five leading zeros. In the case of B−A, mass cancellation of five significant digits occurs leaving a negative result with five leading ones or, stated alternatively, with five leading sign digits equal to one. In both cases, the most significant digit is in the third least significant bit position such that a left shift of five bits is required to normalize the difference. As mentioned above, predicting that five leading significant digits will be eliminated by the subtraction may significantly accelerate the normalization.

The concept of leading zeros/ones/sign digits prediction has been much studied, dating to an early published work by Kershaw, et al., "A Programmable Digital Signal Processor with 32-bit Floating-Point Arithmetic," IEEE Solid State Circuits Conference, Digest of Papers, 1985, pp. 92-93, and substantially summarized by Schmookler and Nowka in "Leading Zero Anticipation and Detection—A Comparison of Methods," Proceedings of the 15th IEEE Symposium on Computer Arithmetic, 2001. Additional techniques were demonstrated in the Seidel and Even paper mentioned above.

With reference to two inputs, P and Q, to an adder that performs an effective subtraction, it is recognized that a string of leading zeros in the resulting difference may be predicted using a (Z*+T*GZ*) pattern match, where Z* denotes a string of one or more Z, and T* denotes a string of one or more T, and where:

$T_i = P_i \text{XOR} Q_i$, $G_i = P_i \text{AND} Q_i$, $Z_i = (!P_i) \text{AND} (!Q_i)$, where $P_i$ and $Q_i$ are corresponding bits of P and Q, respectively, and $T_i$, $G_i$, and $Z_i$ are pattern matching function values of $P_i$ and $Q_i$. It is also recognized that a string of leading ones, or leading sign bits equal to one, may be predicted using a (G*+T*ZG*) pattern match.

As Schmookler and Nowka note in section 2:

In most of the literature, the term leading zeros refers to a starting string of zeros prior to the first one, while leading ones refers to a starting string of ones prior to the first zero. However, there may be some confusion since several papers also use the term leading one predictor for determining the first one after a starting string of zeros. Therefore, in this paper, we avoid the use of that term.

U.S. Pat. No. 6,085,208 to Oberman et al. is entitled: leading one prediction unit for normalizing close path subtraction results within a floating point arithmetic unit. Oberman et al. describe a predictor that predicts the position of a first one bit (i.e., the first significant digit) after a string of leading zeros (i.e., zero or more zeros) in a presumed positive difference of two inputs; hence their use of the term "leading one prediction unit." Stated alternatively, Oberman et al. describe a leading zeros predictor that provides a prediction string used to predict the number of leading zeros present due to mass cancellation in the presumed positive difference. Therefore, in order to avoid confusion for the reasons stated by Schmookler and Nowka, the present disclosure will use the term "leading zeros prediction unit" to refer to the prediction unit of Oberman et al., rather than the term "leading one prediction unit" used in its title. The leading zeros prediction unit of Oberman et al. provides the prediction for a near path subtractor that performs an effective subtraction of two inputs by assuming the difference between the exponent values of the two inputs is +1 or −1 and ordering the inputs to cause the smaller magnitude input to be effectively subtracted from the larger magnitude input to produce a positive difference result. Ordering the inputs to presume a positive result when the exponent difference is +1 or −1 allowed Oberman et al. to provide a leading zeros prediction unit that is optimized to reduce space requirements and increase performance relative to a prior art predictor that only presumed a positive mantissa difference but did not presume an exponent difference of +1 or −1, which was an improvement over a prior art generalized predictor that made neither presumption.

BRIEF SUMMARY OF INVENTION

In one aspect the present invention provides an apparatus for performing an effective subtraction of two floating point inputs each having an unsigned magnitude mantissa and an exponent. The apparatus includes wires and logic that zero-extend by one bit, left-shift by one bit, and invert the mantissa of one of the two inputs having an exponent that is one larger than the exponent of the other of the two inputs to produce a first addend. The wires and logic also zero-extend by one bit the mantissa of the other input of the two inputs to produce a second addend. The apparatus also includes an adder that adds the first and second addends. A negative difference is produced by the adder in response to production of the first and second addends by the wires and logic. The apparatus also includes an inverter that inverts the negative difference to produce an unnormal mantissa. The apparatus also includes a plurality of two-input NAND (NOT-AND) gates that perform a Boolean NAND function on the first and second addends to produce a prediction string. The apparatus also includes a shifter that left-shifts the unnormal mantissa by a shift amount based on the prediction string to produce a normalized mantissa result.

In another aspect, the present invention provides a method for performing an effective subtraction of two floating point inputs each having an unsigned magnitude mantissa and an exponent. The method includes determining a first of the two inputs has an exponent that is one larger than the exponent of a second of the two inputs. The method also includes zero-extending by one bit, left-shifting by one bit, and inverting the mantissa of one of the two inputs that has an exponent that is one larger than the exponent of the other of the two inputs to produce a first addend. The method also includes zero-extending by one bit the mantissa of the other of the two inputs to produce a second addend. The method also includes adding the first and second addends. The adding produces a negative difference in response to the zero-extending by one bit, left-shifting by one bit, and inverting the mantissa of the one of the two inputs that has an exponent that is one larger than the exponent of the other of the two inputs to produce a first addend and to the zero-extending by one bit the mantissa of the other of the two inputs to produce a second addend. The method also includes inverting the negative difference to produce an unnormal mantissa. The method also includes performing a Boolean NAND (NOT-AND) function on the first and second addends to produce a prediction string. The method also includes left-shifting the unnormal mantissa by a shift amount based on the prediction string to produce a normalized mantissa result. The method is performed by an integrated circuit.

In yet another aspect, the present invention provides an apparatus for predicting leading sign digits in a negative difference. The apparatus includes a comparator that determines a larger of two numbers that differ in magnitude by not more than one digit position. The larger of the two numbers is designated as the subtrahend and the smaller as the minuend. The apparatus also includes wires and logic that align the subtrahend relative to the minuend by the not more than one digit position and to invert the aligned subtrahend. The apparatus also includes a plurality of NAND (NOT-AND) gates that perform a Boolean NAND function of corresponding digits of the minuend and the aligned inverted subtrahend to produce a prediction string of bits. A zero value is assigned to the most significant bit of the prediction string. A string of leading zeros of the prediction string predicts a corresponding string of leading sign digits of a negative difference of the minuend and aligned subtrahend.

In yet another aspect, the present invention provides a method for predicting leading sign digits in a negative difference. The method includes determining a larger of two numbers that differ in magnitude by not more than one digit position. The method also includes designating the larger of the two numbers as the subtrahend and the smaller as the minuend. The method also includes aligning the subtrahend relative to the minuend by the not more than one digit position. The method also includes inverting the aligned subtrahend. The method also includes performing a Boolean NAND (NOT-AND) function of corresponding digits of the minuend and the aligned inverted subtrahend to produce a prediction string of bits. The method also includes assigning a zero value to the most significant bit of the prediction string. The method also includes predicting a string of leading sign digits of a negative difference of the minuend and aligned subtrahend by a corresponding string of leading zeros of the prediction string. The method is performed by an integrated circuit.

In yet another aspect, the present invention provides an apparatus for predicting leading sign digits in a negative difference. The apparatus includes comparison logic that determines a larger of two numbers that differ in magnitude by not more than one digit position. The larger of the two numbers is designated as the subtrahend and the smaller as the minuend. The apparatus also includes wires and logic that align the subtrahend relative to the minuend by the not more than one digit position and to invert the aligned subtrahend. The apparatus also includes an arithmetic unit that generates a negative difference in response to the minuend and the aligned inverted subtrahend. The apparatus also includes a leading sign digit predictor that produces a prediction of leading sign digits of the negative difference in response to the minuend and the aligned inverted subtrahend.

In yet another aspect, the present invention provides a method for predicting leading sign digits in a negative difference. The method includes determining a larger of two numbers that differ in magnitude by not more than one digit position. The method also includes designating the larger of the two numbers as the subtrahend and the smaller as the minuend. The method also includes aligning the subtrahend relative to the minuend by the not more than one digit position. The method also includes inverting the aligned subtrahend. The method also includes presenting the minuend and the aligned inverted subtrahend to a binary adder to produce a negative difference. The method also includes presenting the minuend and the aligned inverted subtrahend to a leading sign digit predictor to produce a prediction of leading sign digits of the negative difference. The method is performed by an integrated circuit.

BRIEF DESCRIPTION OF THE DRAWINGS

FIG. 3 is a block diagram illustrating the leading ones predictors of FIG. 2 according to the present invention.

FIG. 5 is an example illustrating operation of the near path addition unit of FIG. 2 according to the present invention.

FIG. 6 is a block diagram illustrating an alternate embodiment of the near path addition unit of FIG. 1 according to the present invention.

DETAILED DESCRIPTION OF THE INVENTION

The present disclosure describes a floating point unit that performs near path effective subtractions by effectively ordering the inputs to designate the smaller magnitude input as the minuend and the larger magnitude input as the subtrahend to produce a negative difference value. Effectively ordering the inputs to presume a negative result when the exponent difference is +1 or −1 allows an accompanying leading ones predictor to provide a prediction string used to predict the number of leading ones in the negative result. Advantageously, the leading ones predictor comprises an array of NAND gates that, particularly when implemented in CMOS semiconductor process technology, may reduce space requirements and increase performance relative to prior art leading digit predictors, such as those discussed above. The leading ones predictor described herein is also referred to as a leading sign digit predictor because it provides a prediction string used to predict the number of leading sign digits, or leading ones, in the negative difference value.

Figure 1:
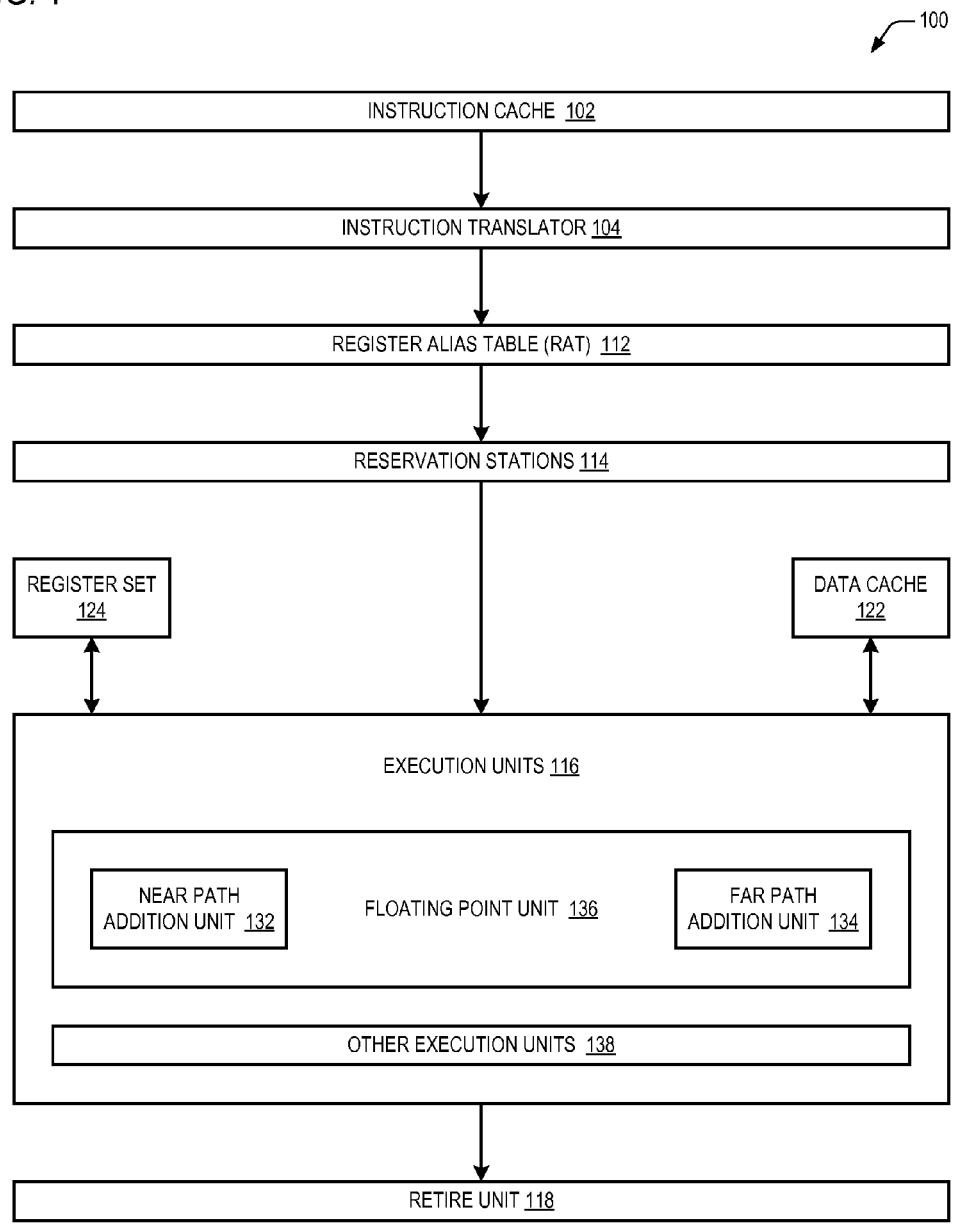
FIG. 1 is a block diagram illustrating a microprocessor including a floating-point near addition unit according to the present invention.

Referring now to FIG. 1, a block diagram illustrating a microprocessor 100 including a floating-point near addition unit according to the present invention is shown. The microprocessor 100 includes an instruction cache 102 that caches instructions fetched from a system memory (not shown). An instruction translator 104 is coupled to receive instructions, such as x86 instruction set architecture floating point instructions, from the instruction cache 102. A register alias table (RAT) 112 is coupled to receive translated microinstructions from the instruction translator 104 to generate dependency information for the translated microinstructions. Reservation stations 114 are coupled to receive the translated microinstructions and dependency information from the RAT 112. Execution units 116 are coupled to receive the translated microinstructions from the reservation stations 114 and to receive instruction operands for the translated microinstructions. The operands may come from a register set 124 and from a data cache 122 coupled to the execution units 116. A retire unit 118 is coupled to receive instruction results from the execution units 116 and to retire the results to architectural state of the microprocessor 100. The execution units 116 include a floating point unit 136 and other execution units 138. The floating point unit 136 includes a near path addition unit 132 and a far path adder 134. The effective subtraction result of the near path addition unit 132 is chosen for cases in which the operands have absolute exponent differences less than or equal to one, and otherwise the far path adder 134 result is chosen. (It is noted, however, that in one particular case where the effective subtraction result of the near path addition unit 132 requires one more bit of representation than is provided by the mantissa storage size, the calculation reverts to being a round calculation that is provided by the far path.)

Figure 2:
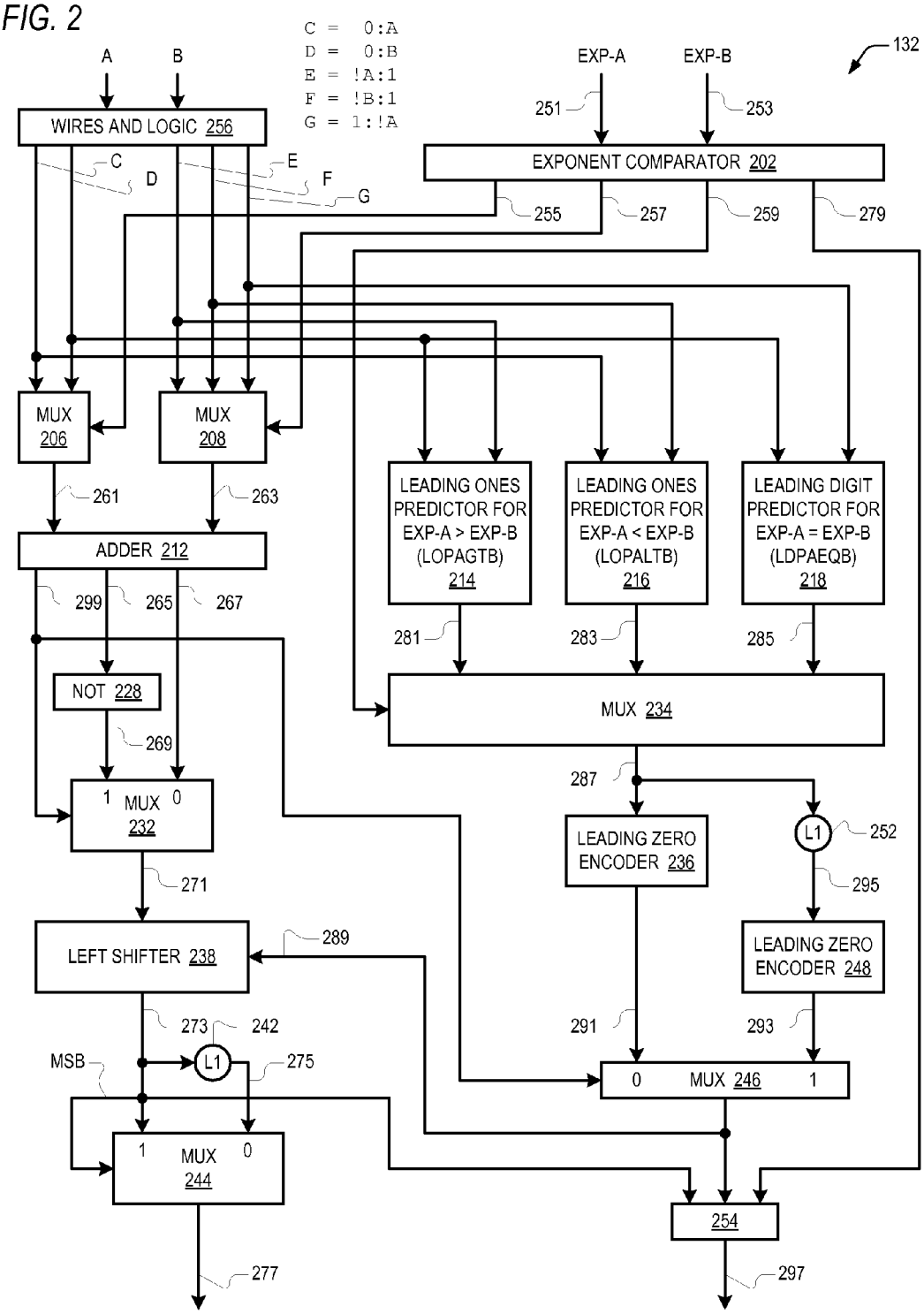
FIG. 2 is a block diagram illustrating in more detail the near path addition unit of the microprocessor of FIG. 1 including leading ones predictors according to the present invention.

Referring now to FIG. 2, a block diagram illustrating in more detail the near path addition unit 132 of the microprocessor 100 of FIG. 1 including leading ones predictors according to the present invention is shown. The near path addition unit 132 receives an instruction that specifies two floating point source operands. Regardless of whether the source operands are normalized and regardless of the order in which they appear in the instruction, by the time the source operands appear at the portion of the near path addition unit 132 shown in FIG. 2, operand sensing circuits in the microprocessor 100 have normalized the source operands, if necessary, into a normalized input operand op-A and a normalized input operand op-B, and the near path addition unit 132 has determined that it needs to calculate a mathematical difference of op-A and op-B to execute the instruction to produce its required result, which may also be a normalized floating point value. Advantageously, the near path addition unit 132 includes two leading ones predictors 214 and 216 that comprise an array, or one-dimensional plurality, of NAND gates incurring merely a single NAND gate delay to predict the amount of left shifting required to normalize a potentially unnormal mantissa difference result 271. The unnormal mantissa difference result 271 is a value that, if non-zero, does not have its most significant digit left-aligned in the desired storage format. As discussed herein, advantageously the NAND gates of the leading ones predictors 214 and 216 may be generally faster and smaller than prior art leading digit predictors, particularly when implemented in CMOS technology.

The normalized input operands op-A and op-B each include a sign bit, an exponent value (denoted EXP-A or EXP-B), and a normalized unsigned magnitude mantissa value. For simplicity, the mantissa of the op-A input operand is referred to as simply "A" and the mantissa of the op-B input operand is referred to as simply "B" in FIG. 2. Additionally, the result produced by the near path addition unit 132 includes a sign bit, an exponent value, and, in one embodiment, a normalized unsigned magnitude mantissa value. The normalized unsigned magnitude mantissa value is denoted 277 in FIG. 2. In one embodiment, the source operands may be in any of the three x86-specified floating point formats, namely the well-known x86 single precision, double precision, and double-extended precision formats; however, the present invention is not limited to these three formats and may be employed with other floating point formats.

The near path addition unit 132 presumes the difference between the EXP-A value and the EXP-B value is +1, 0, or −1; otherwise, the correct instruction result will be generated by the far path portion of the floating-point addition unit. Therefore, if the EXP-A value is greater than the EXP-B value, the near path addition unit 132 presumes the difference between the EXP-A value and the EXP-B value is +1, thus requiring alignment of the A mantissa value before an effective subtraction is performed; and if the EXP-A value is less than the EXP-B value, the near path addition unit 132 presumes the difference between the EXP-A value and the EXP-B value is −1, thus requiring alignment of the B mantissa value before an effective subtraction is performed. Consequently, according to one embodiment, the near path addition unit 132 includes wires and logic 256 that generate complement forms of the input mantissas A and B and form intermediate potentially inverted and aligned values from the true and complement forms of the input mantissas A and B. The intermediate values are all one bit wider than the width of A and B to accommodate alignment by one bit in the event that the absolute difference between the EXP-A value and the EXP-B value is 1. The wires and logic 256 form a first intermediate value denoted "C" by concatenating a zero to the A value as the most significant bit of C; thus, C is a one-bit zero-extended form of A. The wires and logic 256 form a second intermediate value denoted "D" by concatenating a zero to the B value as the most significant bit of D; thus, D is a one-bit zero-extended form of A. The wires and logic 256 form a third intermediate value denoted "E" by concatenating a one to the complemented value of A as the least significant bit of E; thus, E is a form of A that has been inverted after being aligned for the case in which the exponent of op-A is one greater than the exponent of op-B. The wires and logic 256 form a fourth intermediate value denoted "F" by concatenating a one to the complemented value of B as the least significant bit of F; thus, F is a form of B that has been inverted after being aligned for the case in which the exponent of op-B is one greater than the exponent of op-A. The wires and logic 256 form a fifth intermediate value denoted "G" by concatenating a one to the complemented value of A as the most significant bit of G; thus, G is an inverted form of A. The intermediate values are summarized in Table 1 and are shown in FIG. 2.

TABLE 1

| | |
|---|---|
| C | 0:A |
| D | 0:B |
| E | !A:1 |
| F | !B:1 |
| G | 1:!A |

The near path addition unit 132 includes a two-input mux 206 that receives the C and D values and selects one of the inputs to provide on its output 261 based on a control input 255. The near path addition unit 132 includes a three-input mux 208 that receives the E, F, and G values and selects one of the inputs to provide on its output 263 based on a control input 257. The near path addition unit 132 includes a second three-input mux 234 that receives outputs 281, 283, and 285 from the leading digit predictors (discussed in more detail below) 214, 216, and 218, respectively, and selects one of the inputs to provide on its output 287 based on a control input 259.

The near path addition unit 132 includes an exponent comparator 202 that receives the exponent value of the first input operand denoted EXP-A 251 and the exponent value of the second input operand denoted EXP-B 253. The exponent comparator 202 generates values on the control outputs 255, 257, and 259 to control mux 206, mux 208, and mux 234, respectively, according to Table 2.

TABLE 2

| exponent relationship | mux 206 selects | mux 208 selects | mux 234 selects |
|---|---|---|---|
| EXP-A > EXP-B | D | E | 281 |
| EXP-A < EXP-B | C | F | 283 |
| EXP-A = EXP-B | D | G | 285 |

The near path addition unit 132 includes an adder 212 that receives the outputs 261 and 263 of the muxes 206 and 208, respectively. The adder 212 adds its two input values 261 and 263 to produce a sum 265 and an incremented sum 267. Thus, as may be observed from Tables 1 and 2, when EXP-A minus EXP-B equals +1, zero-extended B is designated as the minuend and aligned A is designated as the subtrahend of an effective subtraction performed by the adder 212; when EXP-A minus EXP-B equals −1, zero-extended A is designated as the minuend and aligned B is designated as the subtrahend of an effective subtraction performed by the adder 212; and when EXP-A minus EXP-B equals zero, zero-extended B is designated as the minuend and complemented zero-extended A is designated as the subtrahend of an effective subtraction performed by the adder 212. Thus, when EXP-A minus EXP-B equals +1, the sum 265 is a one's-complement representation of the difference of B minus aligned A, and the incremented sum 267 is a two's-complement representation of the difference of B minus aligned A; when EXP-A minus EXP-B equals −1, the sum 265 is a one's-complement representation of the difference of A minus aligned B, and the incremented sum 267 is a two's-complement representation of the difference of A minus aligned B; and when EXP-A minus EXP-B equals zero, the sum 265 is a one's-complement representation of the difference of B minus A, and the incremented sum 267 is a two's-complement representation of the difference of B minus A. Additionally, a bit 299 is generated out of the adder 212 that indicates the sign of the sum 265. In the embodiment of FIG. 2, the adder 212 is a one-bit sign-extended adder that receives into the additional adder cell a zero bit and a one bit to produce bit 299 as the sum of the zero bit and the one bit and a carry in from the left-most bit of the sum of inputs 261 and 263. It is noted that the sign bit 299 is not provided to inverter 228 and therefore not ultimately represented in value 271 provided to the left shifter 238.

An inverter array 228 receives the sum 265 and generates its complement 269. Thus, when EXP-A minus EXP-B equals +1, the complement 269 is the absolute value of the aligned difference of A and B; when EXP-A minus EXP-B equals −1, the complement 269 is the absolute value of the aligned difference of A and B; and when EXP-A minus EXP-B equals zero, in the case that the magnitude of A is greater than B, the complement 269 is the absolute value of the aligned difference of A and B.

A mux 232 receives the complemented sum 269 and the incremented sum 267. If the bit 299 is a one, i.e., if the sum 265 is negative, the mux 232 selects the complemented sum 269 to provide on its output 271; otherwise, the mux 232 selects the incremented sum 267 to provide on its output 271. When the exponent difference is zero, the sum 265 may be positive or negative. However, advantageously, the near path addition unit 132 is configured to effectively order and align the A and B values such that the sum 265 is a difference result that will be negative when the exponent difference is +1 or −1. Thus, when the exponent difference is +1 or −1, the output 271 is the potentially unnormal aligned absolute value of the arithmetic difference of A and B. Thus, advantageously, when the exponent difference is +1 or −1, the wires and logic 256 and the muxes 206 and 208 cooperatively operate to align the true and complemented versions of the A and B mantissas to effectively order them as inputs to the adder 212 such that the larger magnitude of the aligned A and B inputs is effectively subtracted from the smaller magnitude of the aligned A and B inputs so the adder 212 produces a negative difference value, which advantageously allows the associated leading digit predictor to be a leading ones predictor 214/216 that may be optimized into an array of NAND gates, as described in more detail below.

The near path addition unit 132 also includes a left shifter 238 that left-shifts the output 271 of mux 232 by the number of bits indicated by a shift amount input 289 to produce an output 273. Unless otherwise specified in the present disclosure, a left shift implies that zero values are shifted into the output value lower order bits vacated by the shift left of the input value. The generation of the shift amount 289 is described in more detail below.

The left shifter 238 output 273 is provided to a first input of a two-input mux 244. Wiring 242 left shifts the output 273 to generate a value 275 that is provided to the second input of mux 244. The mux 244 selects the left shifter 238 output 273 if the most significant bit of the output 273 is one, and the mux 244 selects the shifted-by-one value 275 if the most significant bit of the output 273 is zero. The configuration of the shifting wires 242 and mux 244 cooperatively operate to provide a one-bit left-shift correction when necessary, as described in more detail below.

The near path addition unit 132 also includes a leading ones predictor for the case in which EXP-A is greater than EXP-B (denoted LOPAGTB) 214, a leading ones predictor for the case in which EXP-A is less than EXP-B (denoted LOPALTB) 216, and a leading digit predictor for the case in which EXP-A equals EXP-B (denoted LDPAEQB) 218. As discussed herein, advantageously the LOPAGTB 214 and LOPALTB 216 each comprise merely a plurality of NAND gates to predict the amount of shifting required to normalize the mantissa difference result 271.

The LOPAGTB 214 receives the D and E values of Table 1 above and produces its prediction string output 281, based on the D and E values as shown in detail in FIG. 3, which is provided to the first input of mux 234. The LOPALTB 216 receives the C and F values of Table 1 above and produces its prediction string output 283, based on the C and F values as shown in detail in FIG. 3, which is provided to the second input of mux 234. The LDPAEQB 218 receives the D and G values of Table 1 above and produces its prediction string output 285, based on the D and G values, which is provided to the third input of mux 234. As discussed above, the control signal 259 generated by the exponent comparator 202 controls mux 234 to select one of its three inputs 281, 283, or 285 according to Table 2 and selected input value is provided on output 287. The prediction strings 281, 283, and 285 are discussed in more detail below.

Because in the case that the EXP-A and EXP-B values are equal it is not known at the time the effective subtraction is performed by the adder 212 whether the magnitude of the A input or B input is greater to enable ordering of the inputs to guarantee a negative result 271, the result 271 of the addition of D and G may be positive or negative. Therefore, the LDPAEQB 218 is a full leading digit predictor capable of predicting the bit position of the most significant digit (i.e., of predicting the number of leading ones or leading zeroes) of the potentially unnormal difference result 271 whether the result 271 is positive or negative. The construction of full leading digit predictors capable of predicting the bit position of the most significant digit of a positive or negative result is well-known in the art of digital arithmetic circuits.

The near path addition unit 132 also includes a first leading zero encoder 236 that receives the selected prediction string 287 from mux 234. The leading zero encoder 236 encodes the number of leading zeros in the selected prediction string 287 on output 291 which is provided to a first input of a two-input mux 246. Wiring 252 left shifts the output 287 to generate a value 295 that is provided to a second leading zero encoder 248. The leading zero encoder 248 encodes the number of leading zeros in the input 295 on output 293 which is provided to a second input of a two-input mux 246. If the bit 299 is a one, i.e., if the sum 265 is negative, the mux 246 selects the output 293 from the second leading zero encoder 248 to provide on its output 289; otherwise, the mux 246 selects the output 291 from the first leading zero encoder 248 to provide on its output 289. The output 289 of mux 246 is provided as the shift count to left shifter 238, which causes the left shifter 238 to left-shift the potentially unnormal difference result 271 by the shift count 289 to produce the shifted result 273, which as discussed above and below may require an additional one bit left shift correction to normalize the near path mantissa result 277. The leading zero encoders 236 and 248 may be constructed according to various well-known techniques. For example, Schmookler and Nowka describe two methods for efficiently obtaining a leading zeros count.

The exponent comparator 202 also outputs an exponent value 279 that is provided to exponent adjustment logic 254 that produces the near path result exponent value 297. If EXP-A and EXP-B are equal, the exponent comparator 202 outputs their equal value as exponent value 279; if EXP-A is greater than EXP-B, the exponent comparator 202 outputs the value of EXP-A as exponent value 279; if EXP-A is less than EXP-B, the exponent comparator 202 outputs the value of EXP-B as exponent value 279. The exponent adjustment logic 254 decrements the exponent value 279 by the sum of the shift amount 289 and the inverted MSB of the value of left shifter 238 output 273 to produce the near path result exponent value 297.

Although not shown, the near path addition unit 132 includes circuitry for generating the proper sign bit of the near path result. Although not shown, the near path addition unit 132 also includes a circuit to detect a condition in which the inputs to the effective subtraction are equal and to separately produce a zero result. Although not shown, the near path addition unit 132 also includes circuitry for selecting either the near path result or the far path result to provide the final instruction result depending upon the exponent values of the input operands.

Referring now to FIG. 3, a block diagram illustrating the leading ones predictors LOPAGTB 214 and LOPALTB 216 of FIG. 2 according to the present invention is shown.

The LOPAGTB 214 comprises an array of two-bit NAND gates 332. In one embodiment, the number of NAND gates 332 in the array is one less than the number of bits in the D and E values of Table 1 and FIG. 2. The number of bits in the D and E values is one greater than the number of bits in the largest mantissa of the various floating point formats supported by the near path addition unit 132. This additional bit is a result of the alignment of the mantissa inputs required by the exponent difference of +1. For example, if the number of bits in the largest floating point format mantissa is 64 bits, the number of bits in the D and E values is 65 and the number of NAND gates 332 in the array is 64.

The most significant bit of the prediction string 281 produced by the LOPAGTB 214 is a hardwired zero, for reasons discussed below. The next most significant bit of the prediction string 281 is produced by a NAND gate 332 in the array that receives the bit of the D and E values that is one bit position less than their most significant bit position, the next most significant bit position of the prediction string 281 is produced by a NAND gate 332 in the array that receives the bit of the D and E values that is two bit positions less than their most significant bit position, and so forth until the least significant bit position of the prediction string 281 is produced by a NAND gate 332 in the array that receives the bit of the D and E values that is in their least significant bit position.

As discussed in detail above, the near path addition unit 132 is configured to cause the adder 212 to generate a negative difference 265 when the absolute exponent difference of op-A and op-B is one, which advantageously enables a leading digit predictor for the negative difference 265 to be a leading ones predictor. Furthermore, the specific alignment restrictions afforded by the fact that the absolute exponent difference of op-A and op-B is one allow the leading ones predictor to be further optimized to an array of NAND gates 332. An explanation of the optimization will now be provided.

As mentioned above, a string of leading sign digits equal to one in a sum, such as negative difference 265, may be predicted using a (G*+T*ZG*) pattern match of the adder inputs, such as adder 212 inputs 261 and 263, which are the D and E values when EXP-A minus EXP-B is +1, in which case the mux 234 selects the prediction string 281 from the LOPAGTB 214. Specifically, the bit position in which the (G*+T*ZG*) pattern fails is the corresponding bit position of the negative difference 265 in which the most significant digit lies (this is presumed true for the present explanation; however, as discussed in more detail below, the most significant digit of the negative difference 265 may lie one bit position to the left of the corresponding bit position in which the (G*+T*ZG*) pattern fails). Stated alternatively, the corresponding digits of the negative difference 265 to the left of the bit position in which the (G*+T*ZG*) pattern fails are leading sign digits equal to one. As mentioned above, in the pattern (G*+T*ZG*), G* denotes zero or more G functions, and T* denotes zero or more T functions. The leftmost bit of the E and F values is zero because the input mantissas A and B are normalized, i.e., their leftmost bit is one, which inverts to zero. Furthermore, the leftmost bit C and D are zero bit virtue of their zero-extension. Thus, because of the specific alignment and inversion performed by the wires and logic 256 to produce the C, D, E, F, and G values, and selection by the muxes 206 and 208 to provide the adder 212 inputs 261 and 263, it may be observed from Tables 1 and 2 that in the case where the absolute exponent difference is one, the most significant bits of inputs 261 and 263 will always produce Z. That is, the leftmost bit of both D and E is zero (which are selected as inputs 261 and 263 when EXP-A is greater than EXP-B), and the leftmost bit of both C and F is zero (which are selected as inputs 261 and 263 when EXP-A is less than EXP-B); therefore, the most significant bits of inputs 261 and 263 will always be zero when the absolute exponent difference is one such that their function will always be Z. Thus, the pattern that must be matched for the inputs 261 and 263 advantageously reduces from (G*+T*ZG*) to ZG* in the case where the absolute exponent difference is one. Furthermore, since the function is known to be Z for the most significant bit of the inputs 261 and 263, the pattern that must be matched for the remaining bits of the inputs 261 and 263 reduces to G*. Thus, notwithstanding the initial Z, leading sign digits equal to one in the negative difference 265 are predicted by leading bit functions of the inputs 261 and 263 that are G. Therefore, again notwithstanding the initial Z, the leftmost bit function of the inputs 261 and 263 that has a true value for !G predicts the corresponding bit position of the negative difference 265 in which the most significant digit lies. The !G function advantageously may be simplified to a two-input NAND gate, which as shown in FIG. 3, is a NAND gate 332 in each bit position of the inputs 261 and 263, which are D and E, respectively, as shown in FIG. 3, to generate the prediction string 281. NAND gates may be advantageous in CMOS technology designs because the NAND gates may be constructed without a series connection of P-type transistors required by OR gates or NOR gates, for example; thus the NAND gates may be marginally faster and smaller. (It is noted the most significant bits of the inputs 261 and 263 are always Z, as discussed above; therefore, the most significant bit of the prediction string 281 is hardwired to zero to enable leading zero encoding of the prediction string 281 by the leading zero encoders 236 and 248.)

Regarding the need for the one bit correction selectively accomplished by the wiring 242 and mux 244 described above, Schmookler and Nowka state in section 2: "If there are n bit positions before the first mismatch [of Z*+T*ZG*], then the sum will have either (n−1) or n leading [ones]." (emphasis added and edited to describe leading ones context) The reason the sum may have only (n−1) leading sign-digits-equal-to-one rather than n is because of the carries that may propagate from the right side. Thus, the most significant digit of the negative difference 265 may lie at the corresponding bit position in which the (G*+T*ZG*) pattern fails or one bit position to the left thereof. Stated alternatively, the corresponding digits of the negative difference 265 to the left of the bit position in which the (G*+T*ZG*) pattern fails are leading sign digits equal to one; however, because of the carries that may propagate from the right side, the corresponding digit of the negative difference 265 one position to the left of the bit position in which the (G*+T*ZG*) pattern fails may not be a leading sign digit equal to one but may instead be the most significant digit of the negative difference 265. In instances where mux 246 selects input 293, the shift count 289 generated by the leading zero encoder 236 may be one less than n, i.e., n−1. Therefore, the wiring 242 and mux 244 perform one additional bit worth of left shift in the event that the result 271 actually had n leading sign digits equal to one.

Preferably, the leading zero encoders 236 and 248 saturate such that the shift amount 291 and 293 is at most one less than the number of bits in the mantissa value storage size. This accommodates the special case situation in which the inputs 261 and 263 are both a zero followed by all ones, since the LOPAGTB 214 and LOPALTB 216 would from such a set of inputs 261 and 263 generate a relevant selected prediction string 281 or 283 that is all zeroes. Alternatively, the special case situation may be accommodated by appending an additional bit to the right side of the prediction string and hard-wiring the additional right-most bit to one, which would guarantee that the leading zero encoders 236 and 248 produce a useable shift count for the specific arithmetic difference 269 produced in the special case.

As shown in FIG. 3, the LOPALTB 216 comprises an array of two-bit NAND gates 332 essentially identical to the LOPAGTB 214; however, the LOPALTB 216 receives corresponding bits of the C and F values of Table 1 and FIG. 2, rather than the D and E values, and produces prediction string 283, rather than prediction string 281. Additionally, like the LOPAGTB 214, the LOPALTB 216 produces a hardwired zero as the most significant bit of prediction string 283.

Figure 4:
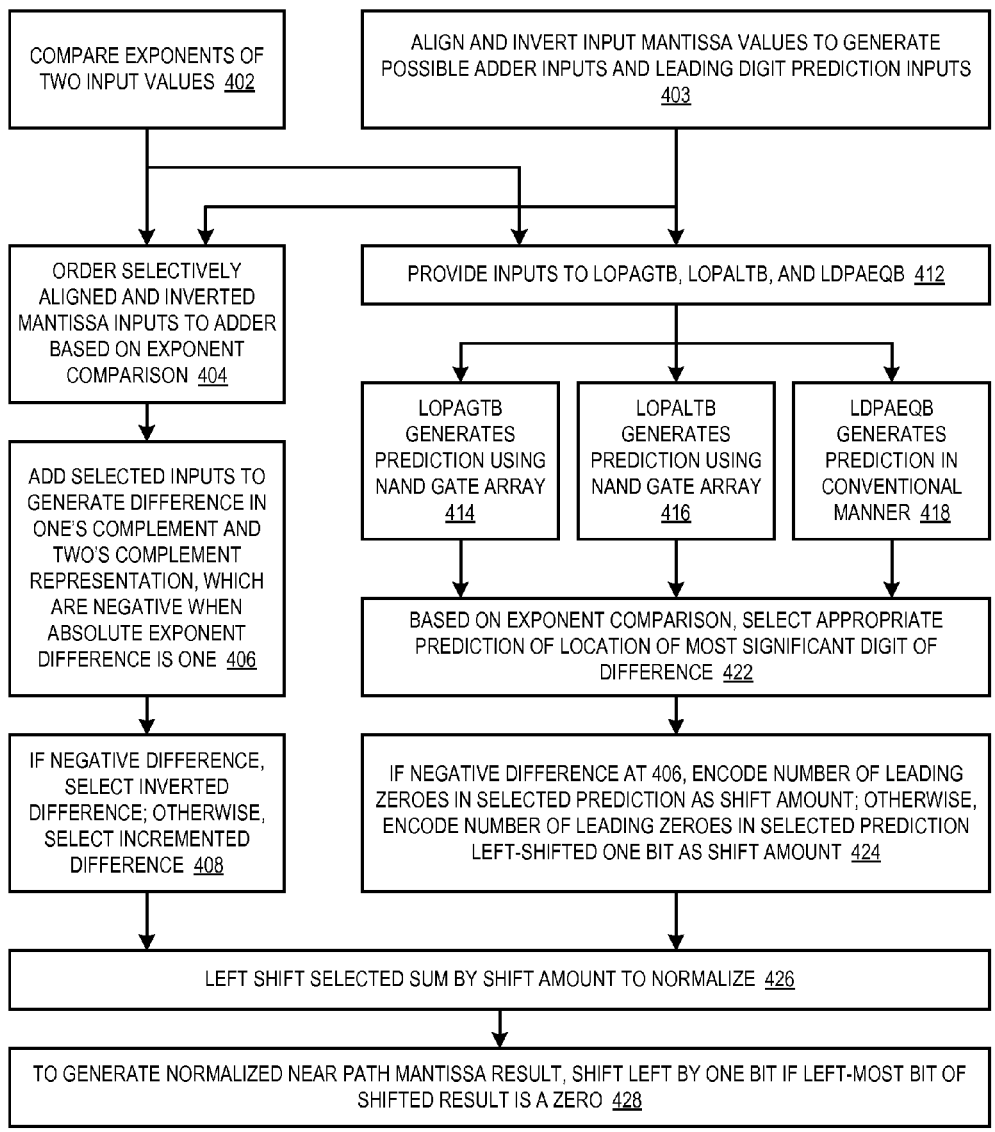
FIG. 4 is a flowchart illustrating operation of the near path addition unit of FIG. 2 according to the present invention.

Referring now to FIG. 4, a flowchart illustrating operation of the near path addition unit 132 of FIG. 2 according to the present invention is shown. Flow begins at block 402.

At block 402, the exponent comparator 202 of FIG. 2 compares the two input exponent values, EXP-A and EXP-B to generate control outputs 255, 257, and 259 of FIG. 2. Flow proceeds from block 402 concurrently to blocks 404 and 412.

At block 403, the wires and logic 256 of FIG. 2 zero-extend and selectively align and invert the A and B mantissa input values to generate the C through G inputs to the muxes 206 and 208 and to the LOPAGTB 214, LOPALTB 216, and LDPAEQB 218. Flow proceeds from block 403 concurrently to blocks 404 and 412.

At block 404, the muxes 206 and 208 order the selectively aligned and inverted inputs generated at block 403 to provide to the adder 212 based on the control signals 255 and 257, respectively, as shown in FIG. 2 and as described above in Table 2. The selection by the muxes 206 and 208 in response to the exponent comparison performed at block 402 effectively designates the aligned mantissa of the larger magnitude of the op-A and op-B inputs as the subtrahend of an effective subtraction to be performed by the adder 212 and effectively designates the aligned mantissa of the smaller magnitude of the op-A and op-B inputs as the minuend of the effective subtraction. Flow proceeds from block 404 to block 406.

At block 406, the adder 212 adds its inputs 261 and 263 to generate the sum 265 of FIG. 2, which is the difference result of an effective subtraction of aligned input mantissas A and B (aligned B minus A when EXP-A minus EXP-B is zero or +1, and aligned A minus B when EXP-A minus EXP-B is −1) in one's complement representation, and to generate the incremented sum 267 of FIG. 2, which is the difference result of an effective subtraction of aligned A and B in two's complement representation. When the absolute difference of the exponent values of op-A and op-B are one, the difference 265 is a negative value. Flow proceeds to block 408.

At block 408, if the sum 265 is negative (i.e., if bit 299 is a one), the mux 232 selects the inverted sum 269 out of the inverter 228 as output 271 of FIG. 2; otherwise, the mux 232 selects the incremented sum 267 as output 271. Flow proceeds from block 408 to block 426.

At block 412, the inputs D and E are provided to the LOPAGTB 214, the inputs F and C are provided to the LOPALTB 216, and the inputs D and G are provided to the LDPAEQB 218 of FIG. 2. Flow proceeds concurrently to blocks 414, 416, and 418.

At block 414, the LOPAGTB 214 generates the prediction string 281 of FIG. 2 using the array of NAND gates 332 shown in the upper portion of FIG. 3. Flow proceeds from block 414 to block 422.

At block 416, the LOPALTB 216 generates the prediction string 283 of FIG. 2 using the array of NAND gates 332 shown in the lower portion of FIG. 3. Flow proceeds from block 416 to block 422.

At block 418, the LDPAEQB 218 generates the prediction string 285 of FIG. 2. Flow proceeds from block 418 to block 422.

At block 422, the control signal 259 generated by the exponent comparator 202 based on a comparison of the EXP-A and EXP-B values controls the mux 234 of FIG. 2 to select the appropriate input 281, 283, or 285 to provide on output 287, as described in Table 2. Flow proceeds to block 424.

At block 424, if the sum 265 generated at block 406 is negative, the mux 246 selects the shift amount 293 generated by the leading zero encoder 248 that receives the left-shifted-by-one version of output 287 as the shift amount 289 provided to the left shifter 238 of FIG. 2; otherwise, the mux 246 selects the shift amount 291 generated by the leading zero encoder 236 that receives the output 287 as the shift amount 289 provided to the left shifter 238. Flow proceeds from block 424 to block 426.

At block 426, the left shifter 238 shifts the potentially unnormal mantissa difference result 271 by the shift amount 289 to generate the potentially normal form mantissa difference result 273 of FIG. 2. Flow proceeds to block 428.

At block 428, if the most significant bit of the potentially normal form mantissa difference result 273 is not a one, i.e., if the result 273 is not normalized, then the mux 244 selects the left-shifted-by-one version 275 of the result 273 as the normalized near path mantissa result 277; otherwise, the mux 244 selects the result 273 as the normalized near path mantissa result 277. Flow ends at block 428.

Referring now to FIG. 5, an example illustrating operation of the near path addition unit 132 of FIG. 2 according to the present invention is shown. The example employs two floating point inputs, op-A and op-B. For simplicity, the input mantissa values are only 8 bits, whereas actual embodiments will typically include many more bits. The op-A input includes an 8-bit mantissa denoted A having a binary value 10110010 and an exponent value denoted EXP-A of decimal 5, as shown in line (1) of FIG. 5. The op-B input includes an 8-bit mantissa denoted B having a binary value 11010110 and an exponent value denoted EXP-B of decimal 4, as shown in line (2) of FIG. 5. Because the value of EXP-A is one greater than the value of EXP-B, the exponent comparator 202 generates a value on control signal 255 to cause mux 206 to select the D input, which is a zero-extended version of mantissa B, having a value of 011010110, as shown in line (3) of FIG. 5. Additionally, the exponent comparator 202 generates a value on control signal 257 to cause mux 208 to select the E input, which is an aligned and inverted version of mantissa A, having a value of 010011011, as shown in line (5) of FIG. 5. The adder 212 generates a sum 265 of the D and E inputs having a value of 101110001, as shown in line (6) of FIG. 5, and an incremented sum 267 having a value of 101110010, as shown in line (7) of FIG. 5, and a sign bit 299 having a value of 1, as shown in line (8) of FIG. 5. As may be observed from line (6), the negative sum 265 has one leading sign digit equal to one; therefore, it is predicted the absolute value of sum 265 will require left shift of one bit position to be in normalized form. Since the leftmost bit of the sum 265 is a one, mux 232 selects the inverted sum 269 for output 271, which has a value of 01000110, as shown in line (9) of FIG. 5. Line (10) of FIG. 5 shows the pattern matching function for the adder inputs 261 and 263, which is ZGTZGTTGT. Because the value of EXP-A is one greater than the value of EXP-B, the exponent comparator 202 generates a value on control signal 259 to cause mux 234 to select the prediction string 281 generated by the LOPAGTB 214 as the output 287, which has a value of 001101101, as shown in line (11) of FIG. 5. As may be observed from line (10), the function fails to match the pattern (G*+T*ZG*) at the T in bit position [6]. Advantageously, as may be observed from line (11), the LOPAGTB 214 employs the array of NAND gates 332 to generate the prediction string 281 having a leftmost one in bit position [6] that corresponds to the T in bit position [6] where the pattern fails to match. Thus, since there are two bit positions before the first mismatch of (Z*+T*ZG*), the sum 265 will have either one or two leading ones, or leading sign digits equal to one. In the example of FIG. 5, the sum 265 has one leading sign digit equal to one rather than two because of the carries that propagate from the right side. The left-shifted-by-one-bit version 295 of prediction string 281 has a value of 011011010, as shown in line (12) of FIG. 5. The leading zero encoder 236 encodes the two leading zeros of prediction string 287 as a shift amount 291 having a decimal value of 2, as shown in line (13) of FIG. 5, and the leading zero encoder 248 encodes the one leading zero of left-shifted-by-one-bit prediction string 252 as a shift amount 293 having a decimal value of 1, as shown in line (14) of FIG. 5. Since bit 299 is a one, mux 246 selects the leading zero encoder 248 output 293 as output 289, which has a decimal value of 1, as shown in line (15) of FIG. 5. Left shifter 238 left shifts the value 271 (01000110) by the shift amount 289 (which is 1) to generate the potentially normalized result 273, which has a value of 10001110, as shown in line (16) of FIG. 5. It is noted that because in the example the input mantissas are 8 bits, the potentially normalized result 273 is also only 8 bits. Finally, since the leftmost bit of the result 273 is a one, the mux 244 selects the result 273, rather than the left-shifted-by-one-bit result 275, as the near path mantissa result 277, which has a value of 10001110, as shown in line (17) of FIG. 5. Additionally, the exponent adjustment logic 254 takes the exponent value 279 output by the exponent comparator 202 (which is 5) and decrements it by the sum (which is 1) of the shift amount 289 (which is 1) and the inverted value of the MSB of the value of left shifter 238 output 273 (which is 0) to produce the near path result exponent value 297, which has a decimal value of 4, as shown in line (17) of FIG. 5.

Referring now to FIG. 6, a block diagram illustrating an alternate embodiment of the near path addition unit 132 of FIG. 1 according to the present invention is shown. The near path addition unit 132 is similar to the embodiment of FIG. 2; however, the inputs to mux 206 and 208 are different than the embodiment of FIG. 2. Mux 206 receives the D and F values as inputs and mux 208 receives the C, E, and G values as inputs. In the embodiment of FIG. 6, the exponent comparator 202 generates values on the control outputs 255, 257, and 259 to control mux 206, mux 208, and mux 234, respectively, according to Table 3.

TABLE 3

| exponent relationship | mux 206 selects | mux 208 selects | mux 234 selects |
|---|---|---|---|
| EXP-A > EXP-B | D | E | 281 |
| EXP-A < EXP-B | F | C | 283 |
| EXP-A = EXP-B | D | G | 285 |

Although embodiments have been described in which the leading ones predictors comprise a plurality of NAND gates to generate a prediction string with a string of leading zeroes to indicate a corresponding string of leading sign digits in the effective difference, other embodiments are contemplated in which the leading ones predictors comprise a plurality of other Boolean gates to generate the prediction string, such as a plurality of AND gates to generate a prediction string with a string of leading ones to indicate a corresponding string of leading sign digits in the effective difference in the event that the integrated circuit is manufactured using a different type of semiconductor process than CMOS in which the other Boolean gates are faster and/or smaller than NAND gates in the different type of semiconductor process.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. An apparatus for performing an effective subtraction of two floating point inputs each having an unsigned magnitude mantissa and an exponent, the apparatus comprising:
   wires and logic, configured to:
      zero-extend by one bit, left-shift by one bit, and invert the mantissa of one of the two inputs having an exponent that is one larger than the exponent of the other of the two inputs to produce a first addend; and
      zero-extend by one bit the mantissa of the other input of the two inputs to produce a second addend;
   an adder, configured to add the first and second addends, wherein a negative difference is produced by the adder in response to production of the first and second addends by the wires and logic;
   an inverter, configured to invert the negative difference to produce an unnormal mantissa;
   a plurality of two-input NAND (NOT-AND) gates, configured to perform a Boolean NAND function on the first and second addends to produce a prediction string; and
   a shifter, configured to left-shift the unnormal mantissa by a shift amount based on the prediction string to produce a normalized mantissa result.

2. The apparatus as recited in claim 1, further comprising:
   a leading zero encoder, configured to encode the number of leading zeroes in the prediction string to produce the shift amount.

3. The apparatus as recited in claim 1, further comprising:
   second wires and logic, configured to left-shift the normalized mantissa result by one additional bit if the most significant bit of the normalized mantissa result is zero.

4. The apparatus as recited in claim 1, wherein the adder adds the first and second addends and the plurality of NAND gates performs the Boolean NAND function on the first and second addends substantially concurrently.

5. The apparatus as recited in claim 1, wherein the NAND gates are manufactured according to a complementary metal oxide semiconductor (CMOS) process.

6. The apparatus as recited in claim 5, wherein the NAND gates manufactured according to the CMOS process do not require a series connection of P-type transistors.

7. The apparatus as recited in claim 1, further comprising:
   a comparator, configured to determine that the one of the two inputs has an exponent that is one larger than the exponent of the other of the two inputs.

8. A method for performing an effective subtraction of two floating point inputs each having an unsigned magnitude mantissa and an exponent, the method comprising:
   determining a first of the two inputs has an exponent that is one larger than the exponent of a second of the two inputs;
   zero-extending by one bit, left-shifting by one bit, and inverting the mantissa of one of the two inputs that has an exponent that is one larger than the exponent of the other of the two inputs to produce a first addend;
   zero-extending by one bit the mantissa of the other of the two inputs to produce a second addend;
   adding the first and second addends, wherein said adding produces a negative difference in response to said zero-extending by one bit, left-shifting by one bit, and inverting the mantissa of the one of the two inputs that has an exponent that is one larger than the exponent of the other of the two inputs to produce a first addend and said zero-extending by one bit the mantissa of the other of the two inputs to produce a second addend;
   inverting the negative difference to produce an unnormal mantissa;
   performing a Boolean NAND (NOT-AND) function on the first and second addends to produce a prediction string; and
   left-shifting the unnormal mantissa by a shift amount based on the prediction string to produce a normalized mantissa result;
   wherein the method is performed by an integrated circuit.

9. The method as recited in claim 8, wherein said left-shifting the unnormal mantissa by a shift amount based on the prediction string to produce a normalized mantissa result comprises:

encoding the number of leading zeroes in the prediction string to produce the shift amount.

10. The method as recited in claim 8, further comprising:

if the most significant bit of the normalized mantissa result is zero, left-shifting the normalized mantissa result by one additional bit.

11. The method as recited in claim 8, wherein said adding the first and second addends and said performing a Boolean NAND function on the first and second addends are performed substantially concurrently.

12. The method as recited in claim 8, wherein said performing a Boolean NAND function on the first and second addends to produce a prediction string is performed by NAND gates manufactured according to a complementary metal oxide semiconductor (CMOS) process.

13. The method as recited in claim 12, wherein the NAND gates manufactured according to the CMOS process do not require a series connection of P-type transistors.

14. An apparatus for predicting leading sign digits in a negative difference, the apparatus comprising:

a comparator, configured to determine a larger of two numbers that differ in magnitude by not more than one digit position, wherein the larger of the two numbers is designated as the subtrahend and the smaller as the minuend;

wires and logic, configured to align the subtrahend relative to the minuend by the not more than one digit position and to invert the aligned subtrahend; and a plurality of NAND (NOT-AND) gates, configured to perform a Boolean NAND function of corresponding digits of the minuend and the aligned inverted subtrahend to produce a prediction string of bits, wherein a zero value is assigned to the most significant bit of the prediction string;

wherein a string of leading zeros of the prediction string predicts a corresponding string of leading sign digits of a negative difference of the minuend and aligned subtrahend.

15. The apparatus as recited in claim 14, wherein the position of the bit of most significance of the prediction string having a value of one predicts the most significant digit position of the negative difference of the minuend and aligned subtrahend.

16. The apparatus as recited in claim 14, wherein the plurality of NAND gates are manufactured according to a complementary metal oxide semiconductor (CMOS) process.

17. A method for predicting leading sign digits in a negative difference, the method comprising:

determining a larger of two numbers that differ in magnitude by not more than one digit position;

designating the larger of the two numbers as the subtrahend and the smaller as the minuend;

aligning the subtrahend relative to the minuend by the not more than one digit position;

inverting the aligned subtrahend;

performing a Boolean NAND (NOT-AND) function of corresponding digits of the minuend and the aligned inverted subtrahend to produce a prediction string of bits;

assigning a zero value to the most significant bit of the prediction string; and predicting a string of leading sign digits of a negative difference of the minuend and aligned subtrahend by a corresponding string of leading zeros of the prediction string;

wherein the method is performed by an integrated circuit.

18. The method as recited in claim 17, wherein the position of the bit of most significance of the prediction string having a value of one predicts the most significant digit position of the negative difference of the minuend and aligned subtrahend.

19. The method as recited in claim 17, wherein said performing a Boolean NAND function of corresponding digits of the minuend and the aligned inverted subtrahend to produce a prediction string of bits is performed by NAND gates manufactured according to a complementary metal oxide semiconductor (CMOS) process.

20. An apparatus for predicting leading sign digits in a negative difference, the apparatus comprising:

comparison logic, configured to determine a larger of two numbers that differ in magnitude by not more than one digit position, wherein the larger of the two numbers is designated as the subtrahend and the smaller as the minuend;

wires and logic, configured to align the subtrahend relative to the minuend by the not more than one digit position and to invert the aligned subtrahend;

an arithmetic unit, configured to generate a negative difference in response to the minuend and the aligned inverted subtrahend; and a leading sign digit predictor, configured to produce a prediction of leading sign digits of the negative difference in response to the minuend and the aligned inverted subtrahend.

21. The apparatus as recited in claim 20, wherein the leading sign digit predictor comprises:

a plurality of Boolean NAND (NOT-AND) gates configured to perform a Boolean NAND function of corresponding digits of the minuend and the aligned inverted subtrahend to produce the prediction of leading sign digits of the negative difference.

22. The apparatus as recited in claim 20, wherein the prediction predicts a string of leading sign digits of the negative difference by a corresponding string of leading zeros of the prediction.

23. The apparatus as recited in claim 20, wherein the prediction predicts a string of leading sign digits of the negative difference by a corresponding string of leading ones of the prediction.

24. A method for predicting leading sign digits in a negative difference, the method comprising:

determining a larger of two numbers that differ in magnitude by not more than one digit position;

designating the larger of the two numbers as the subtrahend and the smaller as the minuend;

aligning the subtrahend relative to the minuend by the not more than one digit position;

inverting the aligned subtrahend;

presenting the minuend and the aligned inverted subtrahend to a binary adder to produce a negative difference; and presenting the minuend and the aligned inverted subtrahend to a leading sign digit predictor to produce a prediction of leading sign digits of the negative difference;

wherein the method is performed by an integrated circuit.

25. The method as recited in claim 24, further comprising:

performing, by the leading sign digit predictor, a Boolean NAND (NOT-AND) function of corresponding digits of the minuend and the aligned inverted subtrahend to produce the prediction of leading sign digits of the negative difference.

26. The method as recited in claim 24, wherein the prediction predicts a string of leading sign digits of the negative difference by a corresponding string of leading zeros of the prediction.

27. The method as recited in claim 24, wherein the prediction predicts a string of leading sign digits of the negative difference by a corresponding string of leading ones of the prediction.

\* \* \* \* \*